US008791590B2

United States Patent
Rouis et al.

(10) Patent No.: US 8,791,590 B2
(45) Date of Patent: Jul. 29, 2014

(54) MICRO-HYBRID SYSTEM PROVIDED FOR SUPPLYING POWER TO AN ELECTRICITY DISTRIBUTION NETWORK OF AN AUTOMOBILE

(75) Inventors: Oussama Rouis, Creteil (FR); Daniel Benchetrite, Creteil (FR); Arnaud De Vries, Vanves (FR); Jean-Claude Matt, Dijon (FR)

(73) Assignee: Valeo Equipements Electriques Moteur, Creteil (FR)

( * ) Notice: Subject to any disclaimer, the term of this patent is extended or adjusted under 35 U.S.C. 154(b) by 751 days.

(21) Appl. No.: 13/056,053

(22) PCT Filed: Jul. 8, 2009

(86) PCT No.: PCT/FR2009/051353
§ 371 (c)(1),
(2), (4) Date: May 17, 2011

(87) PCT Pub. No.: WO2010/012930
PCT Pub. Date: Feb. 4, 2010

(65) Prior Publication Data
US 2011/0227410 A1    Sep. 22, 2011

(30) Foreign Application Priority Data

Jul. 29, 2008 (FR) ...................... 08 55220

(51) Int. Cl.
*B60L 1/00*    (2006.01)
(52) U.S. Cl.
USPC ........................................ 307/10.1
(58) Field of Classification Search
USPC ........................................ 307/10.1
See application file for complete search history.

(56) References Cited

U.S. PATENT DOCUMENTS

| 8,400,111 B2 * | 3/2013 | Ranier et al. ............... 320/132 |
| 2002/0125871 A1 * | 9/2002 | Groom et al. ............... 323/284 |
| 2005/0088139 A1 * | 4/2005 | Frank ............... 320/104 |
| 2007/0288182 A1 | 12/2007 | Douriet et al. |
| 2010/0270095 A1 * | 10/2010 | Shono et al. ............... 180/65.29 |
| 2010/0298088 A1 * | 11/2010 | Rouis et al. ............... 477/3 |

FOREIGN PATENT DOCUMENTS

| EP | 1 383 233 | 1/2004 |
| GB | 2 371 688 | 7/2002 |
| WO | WO 2008/029244 | 3/2008 |

* cited by examiner

*Primary Examiner* — Jared Fureman
*Assistant Examiner* — Duc M Pham
(74) *Attorney, Agent, or Firm* — Berenato & White, LLC

(57) ABSTRACT

Described is a micro-hybrid system for an automobile including: 1) a rotating electrical machine (i.e., a starter/alternator); 2) at least one power converter connectable to an electricity distribution network of the automobile, this network including a power storage unit; and, 3) a control circuit capable of controlling the power converter to provide a power supply current to the electricity distribution network. The system additionally provides a device associated with the control circuit for controlling, during a change of state between the states of providing and not providing the power supply current to the electricity distribution network, an at least partially gradual variation in a charge voltage generated by the power converter so as to obtain a corresponding gradual variation in a network voltage of the electricity distribution network from a first network voltage value to a second network voltage value, a duration of the variation between the first and second network voltage values being predetermined so as to eliminate a negative effect or consequences (surges, dimming of lights, etc.) of a state change on the electronic environment of the micro-hybrid system.

21 Claims, 2 Drawing Sheets

MICRO-HYBRID SYSTEM PROVIDED FOR SUPPLYING POWER TO AN ELECTRICITY DISTRIBUTION NETWORK OF AN AUTOMOBILE

FIELD OF THE INVENTION

The invention relates to a device for a micro-hybrid system capable of equipping an automobile. This micro-hybrid system is intended for supplying power to an electricity distribution network of the automobile.

BACKGROUND OF THE INVENTION

In a conventional system, a battery and a rotating electrical machine supply electrical consumers via the electricity distribution network of the automobile.

The rotating electrical machine, capable of operating as alternator, recharges the battery via a regulating device comprising, in particular, a power converter associated with a control circuit.

Typically, when the heat engine of the automobile is running, the alternator can supply the electrical consumers and charge the battery. When the alternator is not providing current, the battery supplies all the electrical power needs of the automobile.

The supply of power by the system to the electricity distribution network differs in its value, depending on the element, either battery or converter, which provides power to said network.

Generally, the value of the power provided to the network by the battery is less than the value of the power provided by the rotating electrical machine, through the power converter, which generates a charge voltage.

This power converter can be simulated by a switch, authorizing or otherwise, the supply of power from the alternator to the electricity distribution network, according to a pre-established speed profile and installed in the control circuit, this speed profile in particular governing the control of said power converter.

The speed profile is generally pre-established according to parameters such as the rpm of a heat engine of the automobile, the ambient and engine temperatures, the state of charge of the battery and the actions of the driver of the automobile.

Thus, when the power converter for example changes from an active state corresponding to an operational mode (power supply of the network via the converter) to an inactive state corresponding to a blocked mode (no power supply of the network via the converter) or conversely, the value of the charge voltage generated by the converter varies instantaneously.

Indeed, the power converter obeys an Echelon-type control law and thus operates in all or nothing mode.

It follows that the voltage value available on the electricity distribution network also varies instantaneously between two voltage values of said network. These two network voltage values correspond respectively to the charge voltage value generated by the converter and to the voltage value of the battery.

The instantaneous variation in voltage of the electricity distribution network can exhibit an increased amplitude, for example in the order of about 1 Volt to about 4 Volts.

This brutal variation in voltage, synonymous with fluctuation of the power available to the network, produces negative effects on the environment of the system, as regards certain consumers for example.

These effects can be detected by a user, in particular visibly and audibly.

For example, these effects can be detectable variations in luminosity of the light beams from the headlamps of the automobile, or of illumination in the passenger compartment.

These negative effects can also correspond to electromagnetic disturbances related to said brutal variation in power.

These brutal variations in power can thus be felt by a user of the automobile and are likely to be detrimental to the safety and comfort of the user.

Moreover, these drawbacks are accentuated by an increase in the number of electrical consumers equipping the automobile.

There is a need to remedy the aforementioned drawbacks.

SUMMARY OF THE INVENTION

The object of the invention is therefore a micro-hybrid system for an automobile comprising:
 a rotating electrical machine,
 at least one power converter connectable to an electricity distribution network of the automobile, this network comprising a power storage unit,
 a control circuit capable of controlling the power converter to provide a power supply current to the electricity distribution network.

In accordance with the invention, the system comprises a means associated with the control circuit for controlling, during a change of state between the states of providing and not providing the power supply current to the electricity distribution network, an at least partially gradual variation in a charge voltage generated by the power converter so as to obtain a corresponding variation in a network voltage of the electricity distribution network from a first network voltage value to a second network voltage value, a duration of said variation between said first and second network voltage values being predetermined so as to eliminate a negative effect of said state change on the environment of the micro-hybrid system.

Advantageously, the converter does not operate in all or nothing mode, but by virtue of the means associated with the control circuit, authorizes an at least partially gradual variation in the network voltage of said network.

Therefore the invention makes it possible to eliminate the negative effects, detectable by the user related to brutal variations in power, on the electricity distribution network.

The associated means can be installed at least partially in the control circuit.

The variation in the charge voltage can last for a duration determined according to the first and second network voltage values.

Alternatively or additionally, the variation in the charge voltage can comprise a gradient determined according to the first and second network voltage values.

Again alternatively, the gradual variation in the charge voltage can comprise a duration and/or gradient which depends on the current value present at the terminals of the battery.

Moreover, a parameter such as the duration or gradient can be determined on the basis of data contained in a database such as the sensitivity of the eye to detect a variation in luminosity, under various conditions as for example night or day (fluctuation in the level of luminosity of the headlamps), but also the sensitivity of the ear as to detect a variation in sound within the passenger compartment of the automobile (fluctuation in the acoustic level of a car radio).

Again alternatively or additionally, the variation in the charge voltage can comprise a gradient determined according to state of charge data representing a state of charge of the power storage unit.

Possibly the system can include a module to manage and monitor the power storage unit capable of determining the state of charge data of the power storage unit.

This state of charge data, corresponding to states of charge, charge balances and health conditions, can be obtained based on at least one parameter obtained by said management and monitoring module. This parameter can be the temperature, voltage or intensity of the power storage unit for example.

According to one feature of the invention, the module to manage and monitor the power storage unit can be installed at least partially in the control circuit.

During the change of state between the states of not providing and providing the electricity supply current to the electricity distribution network, the associated means control an at least partially gradual variation in the charge voltage generated by the power converter, so as to obtain a corresponding variation in the network voltage of the electricity distribution network from a first network voltage value corresponding to a voltage value, present at the terminals of the power storage unit before said change of state, to a second network voltage value corresponding to a charge voltage value to be generated by said converter.

During the change of state between the states of providing and not providing the power supply current to the electricity distribution network, the associated means control an at least partially gradual variation in the charge voltage generated by the power converter, so as to obtain a corresponding variation in the network voltage of the electricity distribution network from a first network voltage value, corresponding to a charge voltage value generated by said converter before said change of state, to a second network voltage value corresponding to a voltage value present at the terminals of the power storage unit.

According to one mode of embodiment, the associated means comprise:
 a means to obtain power supply data representing the state of supplying power to the electricity distribution network, this state corresponding to a command to activate the power converter,
 a means to obtain the voltage value present at the terminals of the power storage unit,
 a means to obtain the charge voltage value to be generated,
 a means to control the activation of the power converter, and
 a means to control the variation in the charge voltage of the power converter, until the network voltage value is equal to said charge voltage value to be generated.

Moreover, the means comprise:
 a means to obtain non power supply data representing the state of not supplying power to the electricity distribution network, this state corresponding to a command to deactivate the power converter, a means to obtain the charge voltage value generated by the converter before said change of state,
 a means to obtain the voltage value present at the terminals of the power storage unit,
 a means to control the variation in the charge voltage of the power converter, until the network voltage value is equal to said voltage value present at the terminals of the power storage unit, and
 a means to control the deactivation of the power converter.

Alternatively, the means comprise:
 a means to obtain non power supply data representing the state of not supplying power to the electricity distribution network, this state corresponding to a command to deactivate the power converter,
 a means to obtain the charge voltage value generated by the converter before said change of state,
 a means to obtain a value of a current present at the terminals of the power storage unit,
 a means to control the variation in the charge voltage of the power converter, until the value of the current present at the terminals of the power storage unit is substantially zero, and
 a means to control the deactivation of the power converter.

In this alternative, it is not necessary to obtain a voltage value present at the terminals of the power storage unit which can claim to materialize under certain conditions, particularly when the system is in a state of not supplying power to the electricity distribution network.

The system can comprise measurement means, in particular sensors, to determine at least one of the following values:
 a voltage present at the terminals of the power storage unit,
 a current present at the terminals of the power storage unit.

The measurement means can be capable of measuring the voltage at the terminals of the power storage unit when the system is in a state of not supplying power to the electricity distribution network.

The means associated with the control circuit obtain at least one of the voltage and current values, charge it and store it in a memory.

Said memory can be installed in the control circuit.

The measurement means, particularly the sensors, can be installed at least partially in the control circuit.

The measurement means can also be installed at least partially near the power storage unit so as to avoid any errors in measurement. Measurement of a differential type can then be implemented, for example at the terminals of the power storage unit.

In the case of sensors these can be disposed directly on the power storage unit.

The storage unit for example can be constituted as a battery, particularly of the lead type, or a supercondenser, or a plurality of said components.

Moreover the measurement means can be advantageously installed in the module to manage and monitor the power storage unit, or associated with said module.

According to one feature of the invention, a charge voltage value can be determined according to a speed profile associated with the system.

According to another feature of the invention, supply and non supply data can be determined according to the speed profile associated with the system.

The speed profile for example can be associated with the control circuit of the system.

Preferably this speed profile is determined as a function particularly of the rpm of a heat engine of the automobile, ambient and engine temperatures, at least one state of charge of the power storage unit and the actions of the driver of the automobile.

According to other features, the power converter can comprise at least one of an AC-DC converter, reversible or otherwise, and of a DC-DC power converter, reversible or otherwise.

The rotating electrical machine can be an alternator-starter.

Another object of the invention is an automobile comprising a system as described above.

Other features and advantages of the invention will become evident on reading the detailed description below, for the comprehension of which reference shall be made to the figures which it comprises, among which:

DETAILED DESCRIPTION

Figure 1:
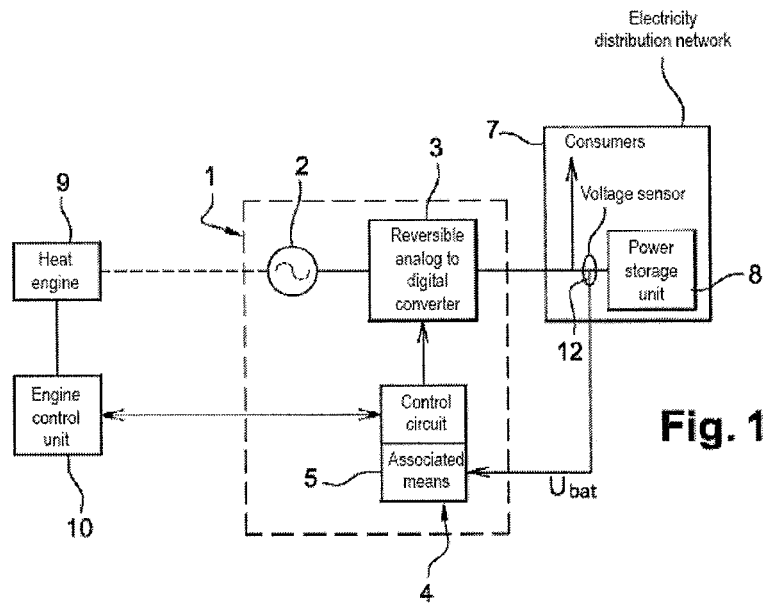
FIGS. 1-3 illustrate, schematically and partially, micro-hybrid systems in accordance with three different modes of embodiment of the invention.

FIG. 1 shows a micro-hybrid system 1 comprising a polyphase reversible rotating electrical machine 2, a reversible analogue to digital converter 3, a control circuit 4 and a means 5 associated with said control circuit 4.

The polyphase reversible rotating electrical machine 2, in the example considered, is constituted by an automobile alternator-starter.

The alternator-starter 2, in addition to being driven by a heat engine 9 for generating power (alternator mode), is capable of transmitting torque to this heat engine 9 for starting (starter mode).

The alternator-starter 2, converter 3 and an electricity distribution network 7 are connected in series.

The electricity distribution network 7 comprises a power storage unit 8.

The power storage unit 8 can include a conventional electric battery, for example of the lead-acid type. This battery 8, in addition to supplying the alternator-starter during the start phase (driving mode), enables power to be supplied to the electrical consumers of the automobile, for example headlamps, a car radio, an air-conditioning unit, windscreen wipers.

The converter 3 permits bidirectional transfer of power between the alternator-starter 2 and battery 8, such transfer being particularly controlled by the control circuit 4 connected to the converter 3.

The control circuit 4 of the micro-hybrid system 1 can be structured around a microprocessor.

The microprocessor 4 is connected to an engine control unit 10 capable of managing the heat engine 9.

The engine control unit 10 is capable of receiving data representing a state of engine 9, particularly via measurement means disposed especially on said engine 9.

These data correspond to parameters such as the rpm of the engine 9, ambient and engine temperatures and the actions of the driver of the automobile.

Depending on these parameters, a speed profile is established, charged and stored in the engine control unit 10.

Alternatively, the speed profile can be pre-established, charged and stored in the engine control unit 10.

The speed profile gives the microprocessor 4 commands to activate and deactivate the converter 3.

These activation and deactivation commands correspond to states of providing and not providing power supply current to battery 8 respectively.

The activation command cuts in particularly when a starting phase of the heat engine appears, and following a phase in which power is not generated.

The deactivation command cuts in particularly when a shutdown phase of the heat motor appears, or when a reduction in the rotational speed of the heat engine induces a phase in which power is not generated.

The means 5 associated with the microprocessor 4 according to the invention will now be described in detail.

In the example described, whenever converter 3 does not allow the supply of power to battery 8, the voltage of the electricity distribution network 7 is then equal to a voltage at the terminals of battery 8.

Associated means 5 obtain the voltage at the terminals of battery 8 designated Ubat.

The voltage Ubat originates from a sensor 12 connected to associated means 5.

Sensor 12 is preferably disposed near battery 8.

The voltage Ubat is then transmitted to means 5 which will charge it and store it in a memory for example of the RAM or EEPROM type ("random access memory" and "electrically erasable programmable read only memory" respectively).

This memory is preferably installed in means 5.

If the engine control unit 10 sends means 5 a command to activate converter 3, then means 5 obtain a charge voltage to be generated by converter 3 designated Uc.

The charge voltage Uc is a reference voltage determined by microprocessor 4 according to parameters which can originate from the engine control unit 10, and particularly from the speed profile which this unit 10 has stored.

In addition the charge voltage Uc is determined according to the power generated by alternator-starter 2 when it operates in alternator mode and depending on the power needs required by the electricity distribution network 7.

For example, voltage Uc can be read in a lookup table memorized in microprocessor 4, this lookup table containing a plurality of charge voltage values associated with various parameters such as the cyclic ratio and temperature of alternator-starter 2.

Voltage Uc is charged then memorized in a memory of means 5.

Means 5 control the activation of converter 3 and impose a gradual variation in voltage Uc supplied by said converter 3 thereon.

This gradual variation is depends on a duration determined by means 5 according to voltages Ubat and Uc.

In the example considered, the duration is read in a lookup table memorized in microprocessor 4, this lookup table containing a plurality of duration values associated with various predetermined voltages Ubat and Uc.

This table is advantageously created by taking into account at least one parameter representing a negative effect indicated above, this effect appearing due to the amplitude of the difference between voltages Ubat and Uc.

The amplitude of the difference between voltages Ubat and Uc, which can be about 1 Volt to about 4 Volts for example, corresponds to the amplitude of variation in the network voltage.

The parameter enabling the duration to be determined can represent the sensitivity of the eye to detect a variation in luminosity, under various conditions as for example night or day (fluctuation in the level of luminosity of the headlamps), but also the sensitivity of the ear to detect a variation in sound in the passenger compartment of the automobile (fluctuation in the acoustic level of a car radio).

Alternatively, the duration can be determined by means 5, without the use of a lookup table for example, by virtue of an algorithm implemented in calculation means of said means 5.

If desirable it is possible to combine an algorithm with a look-up table.

In another example, the gradual variation depends on a gradient determined by means 5 according to voltages Ubat and Uc.

In yet another example, the gradual variation depends on both a duration and a gradient which are functions of the voltages Ubat and Uc.

The gradient is advantageously determined in a manner similar to that of the duration.

In the example considered, means 5 control the gradual variation in voltage Uc of the converter, so as to obtain a corresponding gradual variation in the network voltage of the electricity distribution network 7 until said network voltage is equal to voltage Uc.

Thus, it is possible to eliminate the negative effects on the environment of the micro-hybrid system 1, these effects being produced by the command to activate converter 3, corresponding to the change of state between states of not providing and providing the power supply current to the electricity distribution network 7, and therefore of the variation in the network voltage.

In the example described, when converter 3 allows the supply of power to battery 8, electricity distribution network 7 then has a network voltage equal to the charge voltage Uc supplied by converter 3.

Associated means 5 obtain the voltage Uc and memorize it.

If the engine control unit 10 sends means 5 a command to deactivate converter 3, then these means 5 obtain the voltage Uc supplied by converter 3.

Voltage Uc is read in a lookup table memorized in microprocessor 4, this lookup table containing a plurality of charge voltage values associated with various parameters such as the cyclic ratio and temperature of alternator-starter 2.

Voltage Uc is charged then memorized in a memory of means 5.

Associated means 5 in their memory have the voltage Ubat present at the terminals of battery 8 before converter 3 has been activated.

Means 5 impose a gradual variation in voltage Uc supplied by said converter 3, between the voltage Uc obtained and the voltage Ubat memorized.

The gradual variation depends on a duration determined by means 5 as a function of the voltages Ubat and Uc.

Alternatively or additionally, the gradual variation depends on a gradient determined by means 5 as a function of voltages Ubat and Uc.

In the example considered, the duration and/or the gradient are read in lookup tables memorized in microprocessor 4, this lookup table containing a plurality of duration and/or gradient values associated with various predetermined voltages Ubat and Uc.

Moreover, the table is advantageously created by taking into account at least one parameter representing a negative effect as indicated above.

Means 5 then control the gradual variation in the voltage Uc of the converter, so as to obtain a corresponding gradual variation in the network voltage of electricity distribution network 7 until said network voltage is equal to the voltage Ubat.

Means 5 then control the deactivation of converter 3.

Thus, it is possible to eliminate a negative effect on the environment of the micro-hybrid system, this effect resulting from the command to deactivate converter 3, corresponding to the change of state between the states of providing and not providing the power supply current to electricity distribution network 7.

In the example described on FIG. 1, the variation in the charge voltage Uc is gradual.

Alternatively, the variation in the charge voltage Uc can be partially gradual, in both cases where the command sent by the engine control unit 10 corresponds to activation and deactivation of converter 3.

Indeed, the brutal variations in power available to network 7 produce effects which are negative within the meaning of the present invention, since said effects are detected by the eye or ear of the user of the automobile for example.

Detection here is defined as being the perception of the variation particularly by the human eye or ear.

The negative effects can also correspond to electromagnetic disturbances.

Control circuit 4 can therefore control the charge voltage Uc by imposing on converter 3 a variation in said voltage Uc having a first Echelon-type phase, and a second gradual phase as described in the example of FIG. 1, or vice versa.

In all the micro-hybrid systems which will be described below, variation in the charge voltage Uc can be at least partially gradual.

Figure 2:
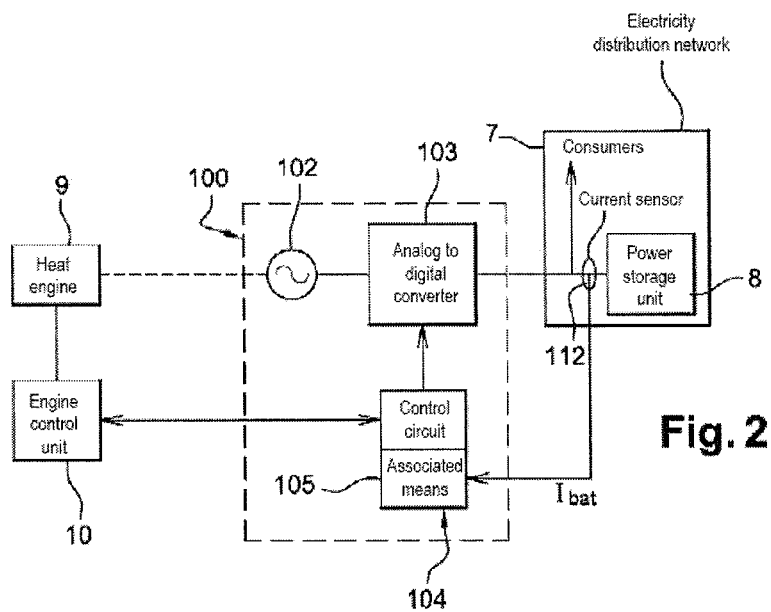

FIG. 2 relates to another mode of embodiment of a micro-hybrid system 100.

Micro-hybrid system 100 comprises a traditional alternator 2 and a non reversible power converter 103.

Alternatively, system 100 may comprise a starting device (not illustrated) associated with alternator 102, instead of the alternator-starter.

The architecture of system 100 is similar to that of the hybrid micro system described on FIG. 1, with its means 105 and control circuit 104.

In the example described, when converter 103 allows the supply of power to battery 8, electricity distribution network 7 then has a network voltage equal to the charge voltage Uc supplied by converter 103.

Associated means 105 obtain the voltage Uc and memorize it.

If the engine control unit 10 sends means 105 a command to deactivate converter 103, then these means 105 obtain the voltage Uc supplied by converter 103.

Voltage Uc is read in a lookup table memorized in the control circuit 104, this lookup table containing a plurality of charge voltage values associated with various parameters such as the cyclic ratio and temperature of alternator-starter 102.

Voltage Uc is charged then memorized in a memory of means 105.

Means 105 obtain a current at the terminals of battery 8 designated Ibat.

This current that corresponds to the network current available on network 7.

The current Ibat originates from a sensor 112 connected to means 105.

Sensor 112 is preferably disposed near battery 8.

The current Ibat is then transmitted to means 105 which will charge the corresponding intensity value and memorize this.

Means 105 impose a gradual variation in voltage Uc supplied by said converter 103, until the current that is substantially zero.

The gradual variation depends on a duration predetermined by means 105.

Alternatively or additionally, the gradual variation depends on a gradient predetermined by means 105.

In the example considered, the duration and/or the gradient can be read in lookup tables memorized in microprocessor 104, this lookup table containing a plurality of duration and/or gradient values particularly associated with various predetermined voltages Uc.

Preferably, the table is created by taking into account at least one parameter representing a negative effect as indicated above.

Means 105 then control the gradual variation in voltage Uc of the converter, so as to obtain a corresponding gradual variation in a network voltage and a network current of network 7 until said network current is substantially zero.

Means 105 then control the deactivation of converter 103.

Therefore, it is possible to eliminate a negative effect on the environment of the micro-hybrid system, this effect resulting from the command to deactivate converter 103, corresponding to the change of state between the states of providing and not providing the power supply current to electricity distribution network 7.

FIG. 3 again relates to another mode of embodiment of a micro hybrid system 200.

The architecture of this system 200 is substantially different from the micro-hybrid system described on FIG. 1.

Micro-hybrid system 200, unlike the micro-system hybrid on FIG. 1, comprises an additional power storage unit 218 and an additional power converter 213.

Power storage unit 218 can advantageously comprise a plurality of capacitive cells so as to form a supercondenser, and power converter 213 is of the reversible DC-DC type.

In the example described, alternator-starter 2 can be used in an architecture of the recuperative braking type, in order to convert some of the mechanical energy resulting from braking into electrical energy, particularly by virtue of supercondenser 218.

A deactivation command can cut in particularly when a recuperative braking phase appears, in addition to the phases indicated above.

DC-DC converter 213 is connected in series between AC-DC converter 3 and battery 8.

Supercondenser 218 is connected in parallel between converters 213 and 3.

Converter 213, in addition to a normal voltage resulting from alternator-starter 2 operating in generator mode, enables a higher voltage, for example a voltage known as "floating", to be supplied to electricity distribution network 7.

This higher voltage can result directly from alternator-starter 2 operating in energy recuperation mode when braking, or from supercondenser 218.

Micro-hybrid system 200 also comprises a control circuit 204 which can be structured around a microprocessor connected to the DC-DC converter 213 and a means 205 associated with microprocessor 204.

Micro-hybrid system 200 also comprises a module 211 to manage and monitor battery 8 associated with sensors 212.

Module 211 can be installed at least partially in means 205.

Alternatively, module 211 can be installed in a means designed to accommodate sensors 212, said means which can be disposed near battery 8.

Module 211 enables the state of charge of battery 8 to be determined, in other words the quantity of power available from battery 8.

This quantity of power can be illustrated by a state of charge of battery 8 or by a charge balance determined depending on a current supplied by battery 8.

The charge balance is determined by a sum of an incoming quantity of power and an outgoing quantity of power. These quantities of power correspond to integration of the current that supplied by battery 8. Moreover, a coefficient, designated coefficient of efficiency, can be allocated to at least one quantity of energy.

Module 211 can also be capable of determining the state of health of battery 8.

These state of charge data of battery 8 are obtained from at least one parameter acquired by module 212.

Preferably, this parameter can be the temperature of battery 8, the current or voltage at the terminals of battery 8.

In the example described, when converter 213 does not allow the supply of power to battery 8, network 7 then has a network voltage equal to a voltage at the terminals of battery 8.

Module 211 obtains the voltage Ubat at the terminals of battery 8.

Voltage Ubat originates from a sensor 12 connected to module 211.

Voltage Ubat is then transmitted to means 205 which will charge the corresponding voltage value and memorize this in a memory of said means 205.

If the engine control unit 10 sends means 205 a command to activate converter 213, then means 205 obtain a charge voltage Uc to be supplied by converter 213.

Voltage Uc is determined by microprocessor 204 depending on parameters which can originate from the speed profile stored in the engine control unit 10, also according to the power supplied by alternator-starter 2 when it operates in alternator mode and from the power needs required by electricity distribution network 7.

Voltage Uc can be read in a lookup table memorized in microprocessor 204, this lookup table containing a plurality of charge voltage values associated with various parameters such as the cyclic ratio and temperature of alternator-starter 2.

In the example described, voltage Uc moreover can be determined depending on a voltage available at the terminals of supercondenser 218.

Voltage Uc is charged then memorized in a memory of means 205.

Means 205 control the activation of converter 213 and impose a gradual variation in voltage Uc supplied by said converter 213 thereon.

This gradual variation depends on a gradient determined by means 205 particularly according to the voltages Ubat and Uc, and a state of charge of battery 8.

The gradient can be read in a lookup table memorized in microprocessor 204, this lookup table containing a plurality of gradient values associated with various predetermined voltages Ubat and Uc, and with predetermined state of charge or charge balance values.

The table is advantageously created by taking into account at least one parameter representing a negative effect indicated above, this effect appearing due to the amplitude of the difference between voltages Ubat and Uc.

In the example on the figure, the amplitude of the difference between the voltages Ubat and Uc, which can be about 1 Volt to about 5 Volts for example, corresponds to the amplitude of variation in the network voltage.

The parameter enabling the gradient to be determined for example can, as indicated above, represent the sensitivity of the eye and/or the sensitivity of the ear.

Alternatively, the gradient can be determined by means 205, by virtue of an algorithm implemented in calculation means of said means 205, with or without the use of a lookup table.

In this case, module 211 obtains particularly at least one of the parameters from among the voltage Ubat, current Ibat and temperature Ibat.

Module 211 determines a state of charge or charge balance value and transmits it to means 205.

The gradual variation can also be function of a duration determined by means 205 depending on the voltages Ubat and Uc, and a state of charge of the battery.

The duration is advantageously determined in a similar manner to that of the gradient.

Of course, the duration and/or gradient can be determined without the state of charge of battery 8.

In the example considered, means 205 control the gradual variation in the voltage Uc of the converter, so as to obtain a corresponding gradual variation in a network voltage of electricity distribution network 7 until said network voltage is equal to the voltage Uc.

Therefore, it is possible to eliminate the negative effects on the environment of micro-hybrid system 200, these effects being produced by the command to activate converter 213, corresponding to the change of state between the states of not providing and providing the power supply current to electricity distribution network 7, and therefore of the variation in the network voltage.

In the example described, when converter 213 allows the supply of power to battery 8, electricity distribution network 7 then has a network voltage equal to the charge voltage Uc supplied by converter 213.

Associated means 5 obtain voltage Uc and memorize it.

If the engine control unit 10 sends means 205 a command to deactivate converter 213, then these means 205 obtain voltage Uc supplied by converter 213.

Voltage Uc can be read in a lookup table memorized in microprocessor 204, this lookup table containing a plurality of charge voltage values associated with various parameters such as the cyclic ratio and temperature of alternator-starter 200.

Voltage Uc moreover can be determined depending on a voltage present at the terminals of super-condenser 218.

Voltage Uc is charged then memorized in a memory of means 205.

Means 205 in their memory have the voltage Ubat present at the terminals of battery 8 before converter 3 is activated.

Alternatively, module 212 is capable of obtaining the voltage Ubat at the terminals of battery 8 when converter 213 allows the supply of power to network 7.

Possibly, the voltage Ubat is then transmitted to means 205 which charge and memorize it.

Means 205 impose a gradual variation in the voltage Uc supplied by converter 213, between the voltages Uc and Ubat.

The gradual variation depends on a gradient determined by means 205 as a function of the voltages Ubat and Uc, and the state of charge or the charge balance of battery 8.

Additionally, the gradual variation can depend on a duration determined by means 205 as a function of the voltages Ubat and Uc, and the state of charge or the charge balance of battery 8.

In the example considered, the gradient and/or the duration are read in lookup tables memorized in microprocessor 204.

Moreover, the table is advantageously created by taking into account at least one parameter representing a negative effect as indicated above.

Means 205 then control the gradual variation in voltage Uc of the converter, so as to obtain a corresponding gradual variation in a network voltage of electricity distribution network 7 until said network voltage is equal to the voltage Ubat.

Means 205 then control the deactivation of converter 213.

Therefore, it is possible to eliminate a negative effect on the environment of the micro-hybrid system, this effect resulting from the command to deactivate converter 213, corresponding to the change of state between the states of providing and not providing the power supply current to electricity distribution network 7.

Figure 3:
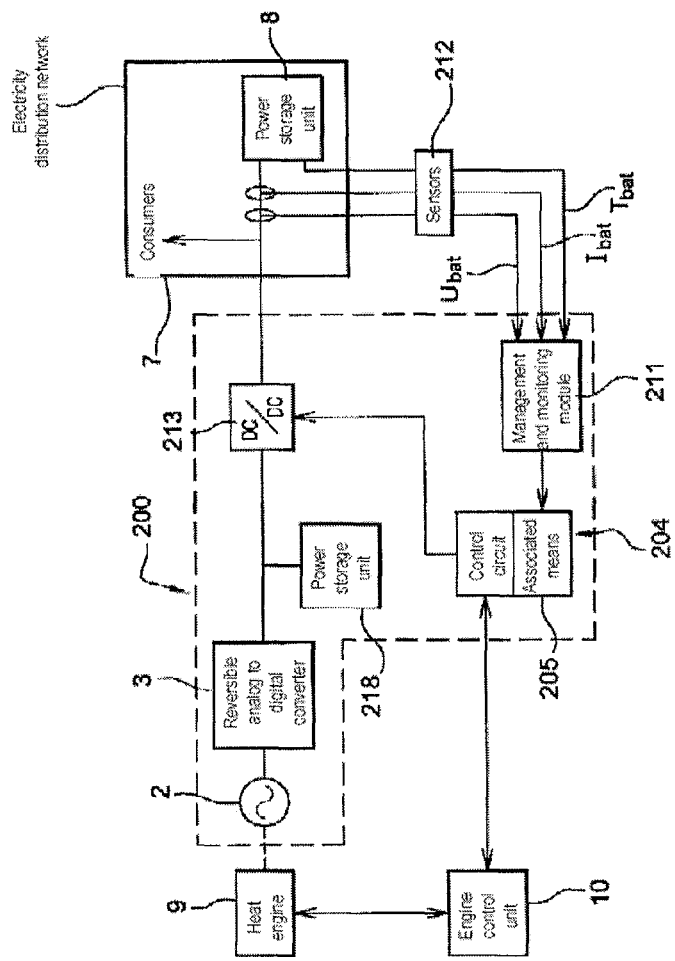

Micro-hybrid system 200 on FIG. 3 and the operation thereof which have just been described are applicable to a micro-hybrid system not enabling operation with recuperative braking mode or otherwise comprising a supercondenser.

In another mode of embodiment of the invention—not illustrated—the micro-hybrid system can comprise, unlike the micro-hybrid system described on FIG. 3, a unit having a reversible DC-DC converter and a supercondenser connected in series, the whole being connected in parallel between the AC-DC converter and the battery.

The reader is invited to refer to French Patent Application FR 2 903 048.

In this case, the control circuit can control both the AC-DC converter and the DC-DC converter.

Moreover, when the state of not supplying power to the network is commanded, this signifies that the two converters must be deactivated, and therefore that the command controlling least partially gradual variation in the charge voltage is capable of being applied to each of the converters.

Of course, if only one of the converters is activated, then the gradual variation command is only applied to said activated converter.

The invention claimed is:

1. A Micro-hybrid system for an automobile, the system comprising:
    a rotating electrical machine;
    at least one power converter connectable to an electricity distribution network of the automobile, the distribution network comprising a power storage unit;
    a control circuit provided for controlling the power converter to provide a power supply current to the electricity distribution network;
    controlling means associated with the control circuit for controlling, during a change of state between states of providing and not providing the power supply current to the electricity distribution network, an at least partially gradual variation in a charge voltage generated by the power converter so as to obtain a corresponding variation in a network voltage of the electricity distribution network from a first network voltage value to a second network voltage value;
    a duration of the variation between the first and second network voltage values is predetermined so as to eliminate a negative effect of the state change on the environment of the micro-hybrid system.

2. The system according to claim 1, wherein the controlling means control the variation in the charge voltage for a duration determined depending on the first and second network voltage values.

3. The system according to claim 1, wherein the variation in the charge voltage comprises a gradient determined depending on the first and second network voltage values.

4. The system according to claim 1, wherein the variation in the charge voltage comprises a gradient, determined depending on state of charge data representing a state of charge of the power storage unit.

5. The system according to claim 4, further comprising a module for managing and monitoring the power storage unit, capable of determining the state of charge data of the power storage unit.

6. The system according to claim 5, wherein the module for managing and monitoring the power storage unit is installed at least partially in the control circuit.

7. The system according to claim 6, wherein the controlling means are installed at least partially in the control circuit.

8. The system according to claim 1, wherein the first network voltage value corresponds to a voltage value present at the terminals of the power storage unit before the change of state, and wherein the second network voltage value corresponds to a charge voltage value supplied by the power converter.

9. The system according to claim 8, wherein the controlling means comprise:

2nd means to obtain power supply data representing the state of supplying power to the electricity distribution network, this state corresponding to a command to activate the power converter;

3rd means to obtain the voltage value present at the terminals of the energy storage unit;

4th means to obtain the charge voltage value to be generated;

5th means to control the activation of the power converter; and

6th means to control the variation in the charge voltage of the power converter, until the value of the network voltage is equal to the charge voltage value to be generated.

10. The system according to claim 1, wherein the first network voltage value corresponds to a charge voltage value supplied by the power converter before the change of state, and the second network voltage value corresponds to a voltage value present at the terminals of the power storage unit.

11. The system according to 10, wherein the controlling means comprise:

$2^{nd}$ means to obtain non-power supply data representing the state of not supplying power to the electricity distribution network, this state corresponding to a command to deactivate the power converter;

$3^{rd}$ means to obtain the charge voltage value generated by the power converter before the change of state;

4th means to obtain the voltage value present at the terminals of the energy storage unit;

$5^{th}$ means to control the variation in the charge voltage of the power converter until the network voltage value is equal to the voltage value present at the terminal of the power storage unit; and $6^{th}$ means to control the deactivation of the power converter.

12. The system according to claim 1, wherein the power converter is one of an AC-DC converter and a DC-DC converter.

13. The system according to claim 1, wherein the rotating electrical machine is an alternator-starter.

14. The system according to claim 1, wherein the power converter is an analog-to-digital converter.

15. A micro-hybrid system for an automobile, the system comprising:

a rotating electrical machine;

at least one power converter connectable to an electricity distribution network of the automobile, the distribution network comprising a power storage unit;

a control circuit for controlling the power converter to provide a power supply current to the electricity distribution network;

means associated with the control circuit for controlling, during a change of state between states of providing and not providing the power supply current to the electricity distribution network, an at least partially gradual variation in a charge voltage generated by the power converter so as to obtain a corresponding variation in a network voltage of the electricity distribution network from a first network voltage value to a second network voltage value;

a duration of the variation between the first and second network voltage values is predetermined so as to eliminate a negative effect of the state change on the environment of the micro-hybrid system, the first network voltage value corresponding to a charge voltage value supplied by the power converter before the change of state, and the second network voltage value corresponding to a voltage value present at the terminals of the power storage unit;

the means for controlling the at least partially gradual variation in the charge voltage further comprising:

$2^{nd}$ means to obtain non power supply data representing the state of not supplying power to the electricity distribution network, this state corresponding to a command to deactivate the power converter;

$3^{rd}$ means to obtain the charge voltage value generated by the power converter before the change of state;

$4^{th}$ means to obtain a value of a current present at the terminals of the power storage unit;

$5^{th}$ means to control the variation in the charge voltage of the power converter, until the value of the current present at the terminals of the power storage unit is substantially zero; and $6^{th}$ means to control the deactivation of the power converter.

16. The system according to claim 15, further comprising measurement means for determining at least one of the following values:

a voltage present at the terminals of the power storage unit; and a current present at the terminals of the power storage unit.

17. The system according claim 16, wherein the measurement means is provided to measure a voltage value of the power storage unit when the system is in a state of not supplying power to the electricity distribution network.

18. The system according to claim 17, wherein the control of the charge voltage value is dependent on a speed profile associated with the system.

19. The system according to claim 17, wherein the controlling means obtain power supply and non-power supply data, the data being determined depending on a speed profile associated with the system.

20. The system according to claim 17, wherein the power converter is one of an AC-DC converter and a DC-DC converter.

21. The system according to claim 15, wherein the rotating electrical machine is an alternator-starter.

* * * * *